(12) United States Patent
Kurose et al.

(10) Patent No.: US 9,354,829 B2
(45) Date of Patent: May 31, 2016

(54) PRINT DEVICE WHICH, WHEN AUTHENTICATION PRINT JOB DATA AT A TIMING WHEN TRANSITION IS ABOUT TO OCCUR IS RECEIVED, CAUSES THE PRINT DEVICE TO TRANSITION AND INTERFERES TRANSITION IF NORMAL PRINT JOB IS RECEIVED

(75) Inventors: Tsutomu Kurose, Ibaraki-ken (JP); Yuuki Aida, Ibaraki-ken (JP); Kouichi Nobushima, Ibaraki-ken (JP); Daisuke Orikasa, Ibaraki-ken (JP)

(73) Assignee: RISO KAGAKU CORPORATION, Tokyo (JP)

( * ) Notice: Subject to any disclaimer, the term of this patent is extended or adjusted under 35 U.S.C. 154(b) by 658 days.

(21) Appl. No.: 13/275,911

(22) Filed: Oct. 18, 2011

(65) Prior Publication Data

US 2012/0099137 A1 Apr. 26, 2012

(30) Foreign Application Priority Data

Oct. 22, 2010 (JP) ................ P2010-237499

(51) Int. Cl.
*G06K 15/00* (2006.01)
*G06F 3/12* (2006.01)
*H04N 1/00* (2006.01)
*H04N 1/32* (2006.01)

(52) U.S. Cl.
CPC .............. *G06F 3/1221* (2013.01); *G06F 3/126* (2013.01); *G06F 3/1267* (2013.01); *G06F 3/1285* (2013.01); *H04N 1/00896* (2013.01); *H04N 1/32363* (2013.01); *H04N 2201/0082* (2013.01); *Y02B 60/1271* (2013.01)

(58) Field of Classification Search
None
See application file for complete search history.

(56) References Cited

U.S. PATENT DOCUMENTS

| | | | |
|---|---|---|---|
| 2007/0165262 A1* | 7/2007 | Watanabe et al. | 358/1.14 |
| 2007/0182998 A1* | 8/2007 | Okada | 358/400 |
| 2009/0316178 A1* | 12/2009 | Tanaka | G06F 21/81 358/1.14 |
| 2010/0268973 A1* | 10/2010 | Park | 713/323 |
| 2011/0249291 A1* | 10/2011 | Tsuzuki | G06F 9/5083 358/1.15 |
| 2012/0162692 A1* | 6/2012 | Aida et al. | 358/1.14 |

FOREIGN PATENT DOCUMENTS

JP 2008-191747 A 8/2008

* cited by examiner

*Primary Examiner* — Vincent Rudolph
*Assistant Examiner* — Richa Mishra
(74) *Attorney, Agent, or Firm* — Greenblum & Bernstein, P.L.C.

(57) ABSTRACT

The printing device 3 includes a print control unit 37 which, if an authentication print job data is received at a timing when transition from a ready mode to a sleep mode is about to occur, causes the printing device 3 to transit to the sleep mode and, and if a normal print job data is received at the timing, causes a printing engine unit 35 to print the normal print job data before transiting to the sleep mode.

4 Claims, 9 Drawing Sheets

PRINT DEVICE WHICH, WHEN AUTHENTICATION PRINT JOB DATA AT A TIMING WHEN TRANSITION IS ABOUT TO OCCUR IS RECEIVED, CAUSES THE PRINT DEVICE TO TRANSITION AND INTERFERES TRANSITION IF NORMAL PRINT JOB IS RECEIVED

BACKGROUND OF THE INVENTION

1. Technical Field

The present invention relates to a printing device which can enhance the user's convenience while reducing unnecessary power consumption.

2. Background Arts

Conventionally, printing devices are often provided with a so-called power-saving function in order to reduce power consumption. In a printing device, the state in which a printing operation can be performed is referred to as the ready mode in which power is supplied to most of the units such as the controller, the panel or the like.

However, always setting to the ready mode significantly increases power consumption of the printing device. Therefore, the printing device transits into a sleep mode (power-saving standby state) if no print job has been received for a certain time period or the sleep mode transition button of the printing device is operated by the user. The power-saving function of the printing device is realized by mode transition between the ready mode and the sleep mode.

On the other hand, there is known a so-called authentication print function which temporarily stores a print job received from an external terminal without printing it at the time of reception, and prints it later based on a print instruction from the user. According to such an authentication print function, a print job is sent to the printing device together with authentication information set by the user, for example. Accordingly, the print job will not be started in the printing device until the authentication information is input. As a result, a situation can be avoided in which a printed matter having highly-confidential information printed thereon is left on the paper output tray and seen by someone else.

A printing device provided with such an authentication print function is immediately set to the ready mode upon receiving an authentication print job during the sleep mode. However, wasteful power may be consumed if the printing device is left without an input of the authentication information. According to the Japanese Patent Laid-Open No. 2008-191747, therefore, the following process is performed if an authentication print job is received with a setting such that no printing will be performed until a predetermined authentication input is provided during the sleep mode.

In other words, transition to the ready mode occurs to perform printing if a predetermined authentication input is provided, whereas the sleep mode is maintained if the predetermined authentication input has not been provided. On the other hand, transition to the ready mode occurs upon receiving a print job for which a print method other than the authentication print has been set (hereinafter, referred to as normal print job). According to the prior art, occurrence of wasteful power consumption can be prevented in the printing device provided with the authentication print function.

SUMMARY OF THE INVENTION

With the above-mentioned prior art, however, if the printing device receives a print job at a timing when transition from the ready mode to the sleep mode is about to occur (for example, if a certain time period has elapsed without receiving a print job, or an instruction requesting transition to the sleep mode is issued), no consideration has been given about how to transit from the ready mode to the sleep mode, or additionally, how the printing will be preformed according to the type of the print job.

It is thus an object of the present invention, which has been made in order to solve the above problem, to provide a printing device which can appropriately perform transition to the sleep mode and processing of the print job if a print job is received at a timing when a printing device is about to transit from the ready mode to the sleep mode.

In order to solve the above problem, a printing device according to an embodiment of the present invention is a printing device which transits, under a predetermined condition (for example, no print job data has been received for a certain time period, or print job data is received during the sleep mode), between a ready mode in which execution of a print job is possible and a sleep mode in which power consumption is smaller than in the ready mode and execution of the print job is impossible (for example, a sleep mode in the normal mode state), the device comprising a printing unit (for example, a printing engine unit 35) which performs a printing operation of a print job, and a control unit (for example, a print control unit 37) which performs a control function that, if an authentication print job which will not be printed until there is an input of predetermined authentication information is received at a timing when transition from the ready mode to the sleep mode is about to occur, causes the printing device to transit to the sleep mode and, if a normal print job other than the authentication print job is received at the timing, causes the printing unit to execute the normal print job before transiting to the sleep mode.

In addition, the printing device according to another embodiment of the present invention is a printing device being set to either a first mode transition state (for example, a normal mode transition state) which transits, under a predetermined condition, between a ready mode in which printing is possible and a first sleep mode (for example, a sleep mode in the normal mode state) in which power consumption is smaller than in the ready mode and printing is impossible, or a second mode transition state (for example, a forced sleep transition state) which maintains a second sleep mode (for example, a sleep mode in the forced sleep transition state), continuously for a predetermined time period (for example, from 8:00 AM to 9:00 PM in FIG. 2), in which power consumption is smaller than in the ready mode but is larger than in the first sleep mode and printing is impossible, the device comprising a memory unit (for example, a memory unit 33) which stores a received print job; a printing unit which performs a printing operation of the print job; a first print control unit which, if one or more print jobs are received, when the first mode transition state is set, at a timing when transition from the ready mode to the first sleep mode is about to occur, causes the memory unit to store, before transiting to the first sleep mode, an authentication job which will not be printed until there is an input of predetermined authentication information among the received print jobs, causes the printing unit to execute normal print jobs other than the authentication print job, and causes the printing unit to execute the authentication print job stored in the memory unit according to the input of the predetermined authentication information, after transition from the first sleep mode to the ready mode occurred; and a second print control unit which, if a print job is received when the second mode transition state is set, causes the memory unit to store the received print job, and causes the printing unit to execute the print job stored in the memory unit after transition to the first mode transition state and transition to the ready mode occurred.

DESCRIPTION OF THE EMBODIMENTS

<First Embodiment>

A first embodiment of the present invention will be described, referring to the drawings.

[Configuration of the Printing System]

Figure 1:
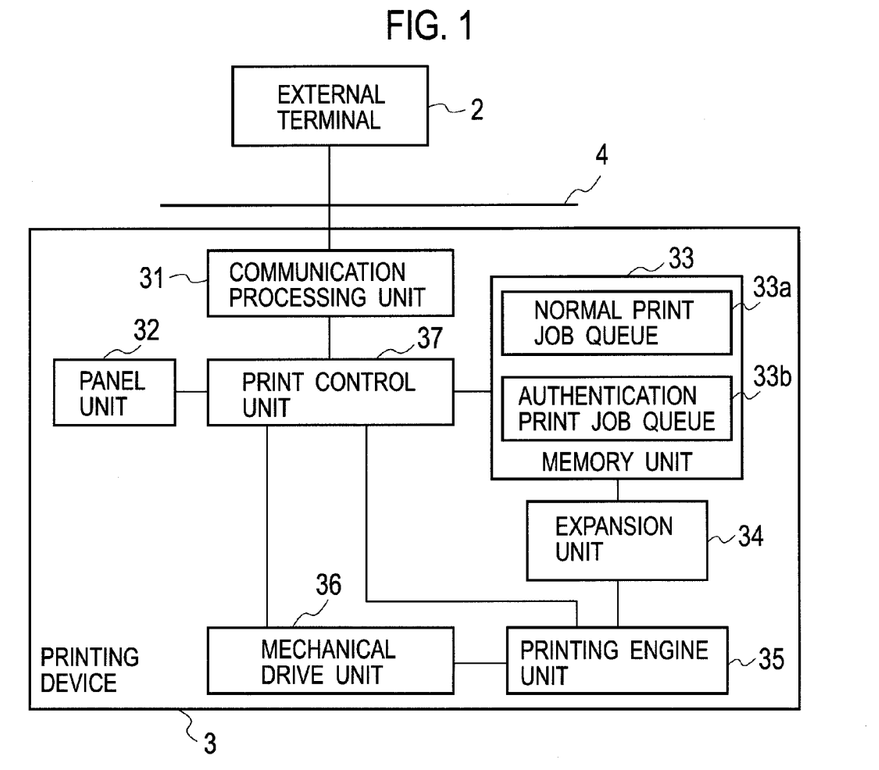
FIG. 1 is a block diagram illustrating a configuration of a printing system according to a first embodiment.

As shown in FIG. 1, a printing system 1 according to a first embodiment comprises a printing device 3, an external terminal 2, and a communication path 4 connecting the printing device 3 and the external terminal 2.

The printing device 3 may be, for example, an inkjet printer. The external terminal 2 may be, for example, a desktop personal computer, a personal digital assistant, or the like. Here, although a case with one external terminal 2 and one printing device 3 is described as an example, one or more external terminals 2 may be connected to one or more printing devices 3 via the communication path 4.

In addition, data communication between the external terminal 2 and the printing device 3 is performed according to a predetermined communication protocol. The data includes source IP addresses and destination IP addresses. The data communication is performed based on these IP addresses.

(Configuration of the External Terminal 2)

The external terminal 2 has a function capable of generating image data and transmitting the image data to the printing device 3 as print job data Specifically, the external terminal 2 has installed therein a printer driver which operates as a control program, an OS and application software which operates as application programs. Image data is generated on the external terminal 2 by execution of the application software, or input of a variety of information by the user to generate the image data. Execution of the printer driver enables a variety of print settings (for example, input of authentication information such as passwords) for the generated image data.

When a variety of print settings are input from an input unit (not shown), the printer driver generates print job data including the image data, data indicating a variety of print settings, and user IDs associated with the external terminals 2, and transmits it to the printing device 3. The generated print job data is data that can be interpreted by the printing device 3 (for example, PDL data such as PostScript).

Here, when printing highly-confidential or secured information, it is desired to avoid a situation in which the printed matter printed by the printing device 3 is left and seen by someone else. In such a case, the user can input, as the variety of print settings, information indicating that the print is an authentication print and authentication information such as passwords, using an input unit (not shown). As a result, the print job data generated by the printer driver includes an authentication flag indicating whether or not the print is an authentication print and authentication information when the authentication flag indicates an authentication print.

The print job data including the authentication information is transmitted to the printing device 3. The printing device 3 does not output a printed matter corresponding to the print job data unless authentication information corresponding to the print job data is input. In the following, print job data including authentication information will be referred to as authentication print job data and print job data not including authentication information will be referred to as normal print job data.

(Configuration of the Communication Path 4)

The communication path 4 is a data transfer path connecting the external terminal 2 and the printing device 3. The communication path 4 includes at least one data transfer path of a wired LAN, a wireless LAN, the Internet, or the like.

(Configuration of the Printing Device 3)

As shown in FIG. 1, the printing device 3 comprises a main power switch unit (not shown), a power supply unit (not shown), a panel unit 32, a communication processing unit 31, a memory unit 33, an expansion unit 34, a mechanical drive unit 36, a printing engine unit 35 which drives the mechanical drive unit 36, and a print control unit 37, also referred to as a print controller, which controls respective units.

The main power switch of the printing device 3 is a switch which turns ON and OFF the entire power supply of the printing device 3. In detail, the main power switch is a switch for causing the printing device 3 to transit from an OFF state to a standby mode, or transit from a state other than the OFF state (for example, standby mode, sleep mode, ready mode, etc.) to the OFF state.

The power supply unit supplies power supplied through the main power switch to respective units such as the print control unit 37, the panel unit 32, and the printing engine unit 35.

The panel unit 32 is an operation control unit for the user to perform a variety of operations, for example, printing, of the printing device 3. Although not illustrated, the panel unit 32 has built therein a display unit which displays the operation state, for example, and a touch panel or the like through which operation is performed. In addition, the panel unit 32 has connected thereto a sleep mode/ready mode instruction operation key and a standby mode/ready mode instruction operation key. The sleep mode/ready mode instruction operation key is a switch for transiting between the sleep mode and the ready mode. The standby mode/ready mode instruction operation key is a switch for transiting between the standby mode and the ready mode.

Here, a variety of modes to which transition can be made by the printing device 3 will be described. The modes include an OFF mode, a standby mode, a ready mode, and a sleep mode.

The OFF mode is a state in which the main power switch is at the OFF state, and none of the units have power supplied thereto.

The standby mode is a state in which the main power switch has been turned ON from OFF, and power is supplied to the power supply unit, the panel unit 32, and the print control unit 37. In this mode, however, printing is still impossible. The mode of the printing device 3 transits to the ready mode based on an operation instruction by the standby mode/ready mode instruction operation key.

The ready mode is a state in which all the units of the printing device 3 have power supplied thereto, and printing of the print job data can be performed.

The sleep mode is a power-saving standby state (power reduction state) automatically transited from the ready mode. The sleep mode is a state in which power consumption is smaller than the ready mode and printing of the print job data is impossible. The sleep mode includes a sleep mode in the first mode transition state and a sleep mode in the second mode transition state, details of which will be described below.

The print control unit 37 performs control (setting, management) on transition of a variety of modes (standby mode, sleep mode, ready mode) other than the OFF mode as a mode of the printing device 3, based on whether or not the transition condition of each mode is satisfied.

In addition, the print control unit 37 performs an operation of switching between two mode transition states according to the time zone associated with the number of sets of received print job data. In other words, the print control unit 37 sets the mode transition state to either the first mode transition state (normal mode transition state, hereafter) or the second mode transition state (forced sleep transition state, hereafter), according to the time zone associated with the number of sets of received print job data.

For example, for time zones of a day, the normal mode transition state is set during duty hours in which many sets of print job data are assumed to be received, whereas forced sleep transition state is set during off-duty hours in which the number of sets of received print job data is assumed to be fewer.

In the normal mode transition state, transition between the ready mode and the sleep mode occurs under a predetermined condition. In other words, transition between the normal ready mode and the sleep mode occurs in the normal mode transition state. Specifically, after having transited to the ready mode, transition to the sleep mode occurs if print job data has not been received for a certain time period, or by an instruction to transit to the sleep mode via the sleep/ready instruction operation key. In addition, after having transited to the sleep mode, transition to the ready mode occurs by an instruction to transit to the ready mode via the sleep/ready instruction operation key, or reception of print job data.

During the sleep mode in the normal mode transition state (sleep mode of the normal mode transition state, hereafter), power is supplied only to the communication processing unit 31, the print control unit 37, the panel unit 32, and the power supply unit. Although reception of print job data and instructions to switch between the sleep mode and the ready mode can be accepted during the sleep mode of the normal mode transition state, other processes (for example, storing the received print job data, or printing the print job data) cannot be performed.

In the forced sleep transition state, the sleep mode is maintained continuously for a predetermined time period if transition from the ready mode to the sleep mode occurs. The sleep mode in the forced sleep transition state will be referred to as the sleep mode of the forced sleep transition state in the following. When the start timing of the forced sleep transition state is reached, in the ready mode, the print control unit 37 causes transition to the sleep mode of the forced sleep transition state and maintains the sleep mode of the forced sleep transition state until the end timing of the forced sleep transition state. Alternatively, if transition to the sleep mode of the normal mode transition state has already been made at the start timing of the forced sleep transition state, the print control unit 37 sets to the sleep mode of the forced sleep transition state, and maintains the sleep mode of the forced sleep transition state until the end timing of the forced sleep transition state. The print control unit 37 switches the mode transition state of the printing device 3 from the forced sleep transition state to the normal mode transition state at the end timing of the forced sleep transition state. In this occasion, the print control unit 37 causes transition of the mode of the printing device 3 from the sleep mode of the forced sleep transition state to the ready mode.

The sleep mode of the forced sleep transition state is the power-saving standby state (power reduction state) automatically transited from the ready mode in advance when a predetermined timing is reached. The processes capable of power supply in the sleep mode of the forced sleep transition state are the same as the case of the normal mode transition state except for the points described below. That is, a storage operation of the received print job data can be performed. Accordingly, the sleep mode of the forced sleep transition state has a smaller power consumption than the ready mode, but the power consumption grows larger than the sleep mode of the normal mode transition state.

Here, if the printing device 3 successively receives a plurality of sets of print job data when transition from the ready mode to the sleep mode is about to occur during the normal mode transition state, the following process is performed in consideration of both power-saving by sleeping and outputting printed matters as soon as possible.

The print control unit 37 performs the following process, if the communication processing unit successively receives a plurality of sets of print job data at a timing when transition from the ready mode to the sleep mode of the normal mode transition state is about to occur, with the mode transition state being set to the normal mode transition state.

That is, the print control unit 37 causes the printing engine unit 35 to print the normal print job data before transiting to the sleep mode of the normal mode transition state. On the other hand, the print control unit 37 causes the mode of the printing device 3 to transit to the sleep mode of the normal mode transition state without printing the authentication print job data. The print control unit 37 then causes the printing engine unit 35 to print the authentication print job data (control of the normal mode transition state) after having transited from the sleep mode of the normal mode transition state to the ready mode.

If, on the other hand, print job data is received while the mode transition state is present in the forced sleep transition state, the print control unit 37 causes the printing engine unit 35 to print the print job data (control of the forced sleep transition state) after having transited to the normal mode transition state (i.e., after having transited to the ready mode via the sleep mode of the forced sleep transition state).

Here, successively receiving a plurality of sets of print job data refers to receiving a next print job data during a predetermined time period in which expansion and printing operations are enabled after having received one set of print job data. The communication processing unit 31 may calculate the predetermined time period after having received the print job data, or may preliminarily determine it from the averaged of the predetermined time period of a predetermined number of sets of print job data which were received in the past.

In addition, the print control unit 37 is provided with a timer function for time keeping. In addition, the print control unit 37 stores the print job data received by the communication processing unit 31 in either a normal print job queue 33a or an authentication print job queue 33b in the memory unit 33, based on an authentication flag in the print job data.

In addition, if the print job data stored in the memory unit 33 is expanded by the expansion unit 34 and printed by the printing engine unit 35, the print control unit 37 deletes the print job data stored in the memory unit 33. If, however, the operation unit 32 instructs re-printing, the print control unit 37 keeps the print job data which has been printed.

In addition, the print control unit 37 has a function of controlling power supply from the power supply unit to respective units (the communication processing unit, the memory unit 33, the expansion unit 34, the printing engine unit 35, and the mechanical drive unit 36) in the standby mode, the sleep mode, and the ready mode.

The memory unit 33 has the normal print job queue 33a for storing normal print job data and the authentication print job queue 33b for storing authentication print job data.

Based on the instruction of the print control unit 37, the expansion unit 34 reads the print job data stored in the normal print job queue 33a or the authentication print job queue 33b, and expands it into data which can be printed by the printing engine unit 35 (for example, bitmap expansion where a pixel value is associated with each pixel). When the expansion process of the print job data is terminated, the result is sent to the print control unit 37. The print control unit 37 instructs the expansion unit 34 to send the already expanded print job data to the printing engine unit 35.

Based on control from the print control unit 37, the printing engine unit 35 performs drive control of the mechanical drive unit 36, based on the print job data expanded by the expansion unit 34.

The mechanical drive unit 36 has a print head which ejects color ink and monochromatic ink which are not illustrated, and a mechanical printing mechanism such as a transportation roller. Based on control from the printing engine unit 35, the mechanical drive unit 36 performs a printing operation on paper sheets or the like, using the print head and the mechanical printing mechanism.

[Print Control Method of the Printing Device 3]

Next, a print control method using the printing system according to the first embodiment will be described referring to FIGS. 2 to 8.

(Outline of the Print Control Method)

Figure 2:
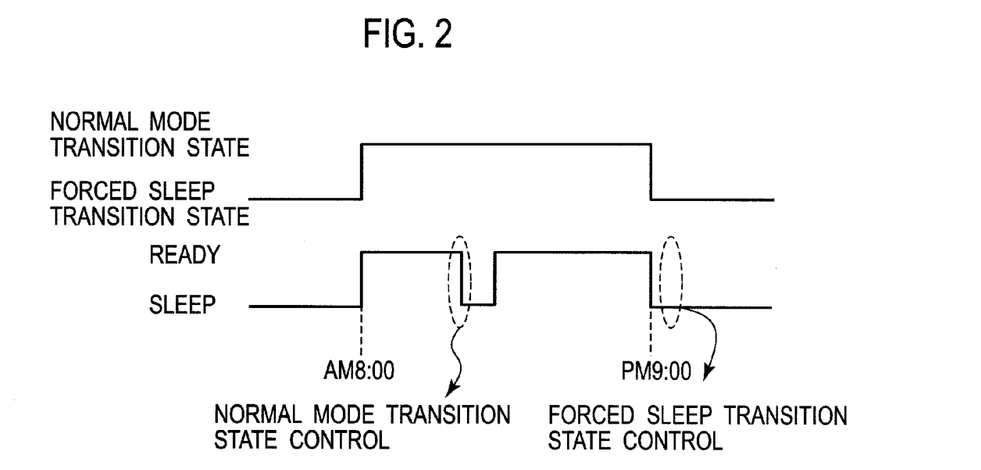
FIG. 2 is a timing chart illustrating the outline of a print control method according to the first embodiment.

FIG. 2 is a timing chart indicating the outline of a print control method of the present embodiment. As shown in FIG. 2, the print control unit 37 sets, for each time zone of a day, the state of the printing device 3 to the forced sleep transition state or the normal mode transition state. The forced sleep transition state is associated with time zones in which the number of sets of received print job data is small or expected to be small. In addition, the normal mode transition state is associated with time zones in which the number of sets of received print job data is large or expected to be large.

Here, as an example, a time zone 8:00 AM to 9:00 PM indicating typical duty hours has the normal mode transition state associated therewith, whereas a time zone 9:00 PM to 8:00 AM indicating off-duty hours has the forced sleep transition state associated therewith. However, the forced sleep transition state and the normal mode transition state may be associated with time zones other than those mentioned above.

If a plurality of sets of print job data is successively received when transiting from the ready mode to the sleep mode occurs of the normal mode transition state during the normal mode transition state, control of the normal mode transition state is performed. If, on the other hand, print job data is received during the forced sleep transition state, control of the forced sleep transition state is performed.

(Print Job Data Generation, Reception, and Storage Process)

Figure 3:
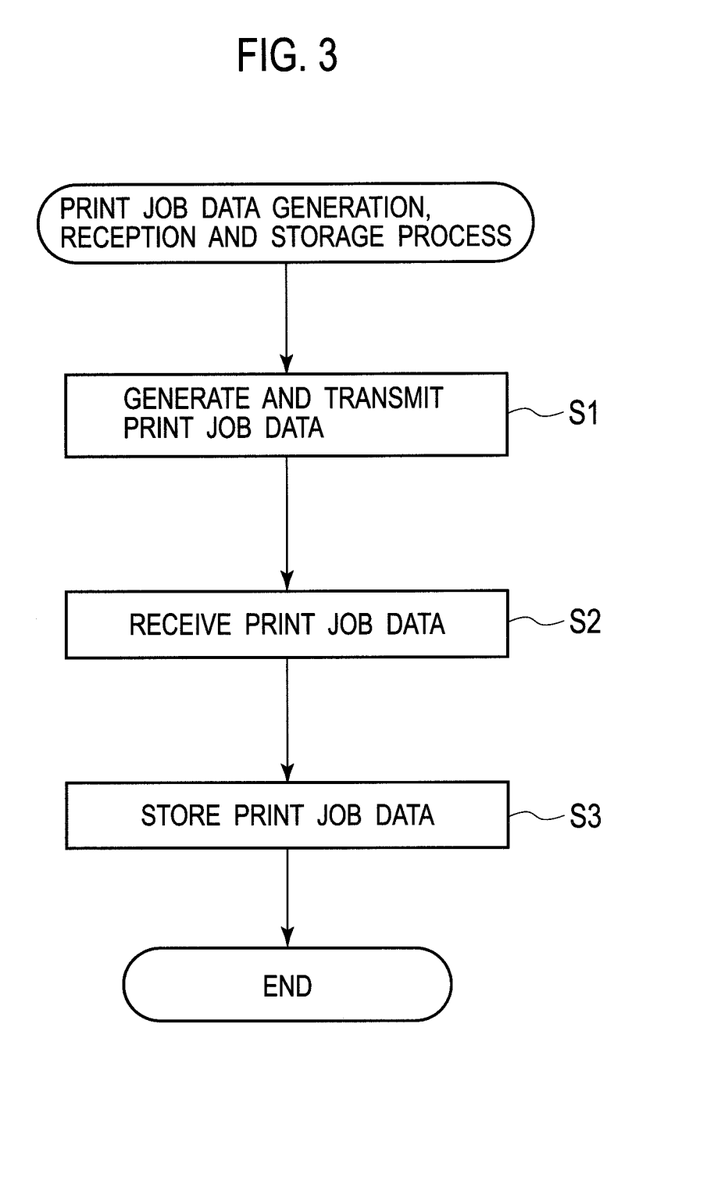
FIG. 3 is a flow chart illustrating the print control method according to the first embodiment.

FIG. 3 is a flow chart indicating print job data generation, reception, and storage process.

First, the external terminal 2 generates print job data (normal print job data or authentication print job data), and transmits it to the printing device 3 (step S1). In this occasion, an authentication flag is included in the print job data. The normal print job data has set therein, as the authentication flag, information indicating that authentication is unnecessary, whereas the authentication print job data has set therein, as the authentication flag, information indicating that authentication is necessary.

In the printing device 3, print job data is received by the communication processing unit 31 (step S2). The communication processing unit acquires the authentication flag and the authentication information included in the print job data, and transmits them to the print control unit 37.

The print control unit 37 stores the print job data received by the communication processing unit 31 in the memory unit 33 (step S3). Specifically, the print control unit 37 performs the following process, referring to the authentication flag in the print job data. That is, the print control unit 37 stores the print job data (normal print job data) received by the communication processing unit 31 in the normal print job queue 33a of the memory unit 33 if information indicating the unnecessity of authentication is acquired. Alternatively, the print control unit 37 stores the print job data (authentication print job data) received by the communication processing unit 31 in the authentication print job queue 33b of the memory unit 33 if information indicating the necessity of authentication is acquired.

(Mode Transition State Check Process)

Figure 4:
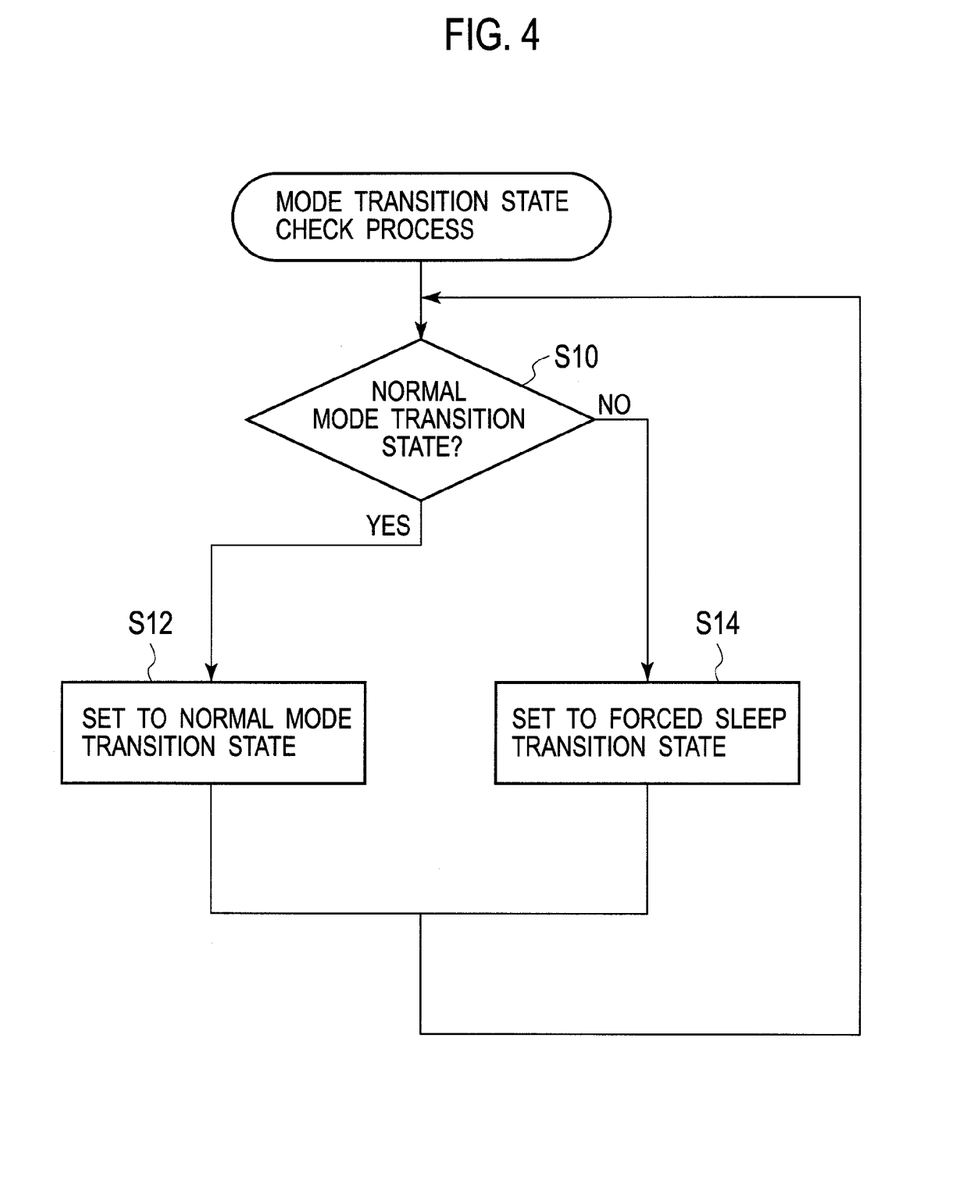
FIG. 4 is a flow chart illustrating the print control method according to the first embodiment.

FIG. 4 is a flow chart illustrating a mode transition state check process.

The print control unit 37 determines whether or not the current time corresponds to the normal mode transition state, referring to the correspondence relation between each time zone and each mode transition state, based on the provided timer function (step S10).

If the current time corresponds to the normal mode transition state, the print control unit 37 sets the mode transition state to the normal mode transition state (step S12). If, on the other hand, the current time does not correspond to the normal mode transition state, the print control unit 37 sets the mode transition state to the forced sleep transition state (step S14).

Subsequently, the print control unit 37 performs the process of step S10. Here, whether or not transition to the normal mode transition state has been made by the print control unit 37 is determined in a constant periodical time interval.

(Mode Transition State Control Process)

Figure 5:
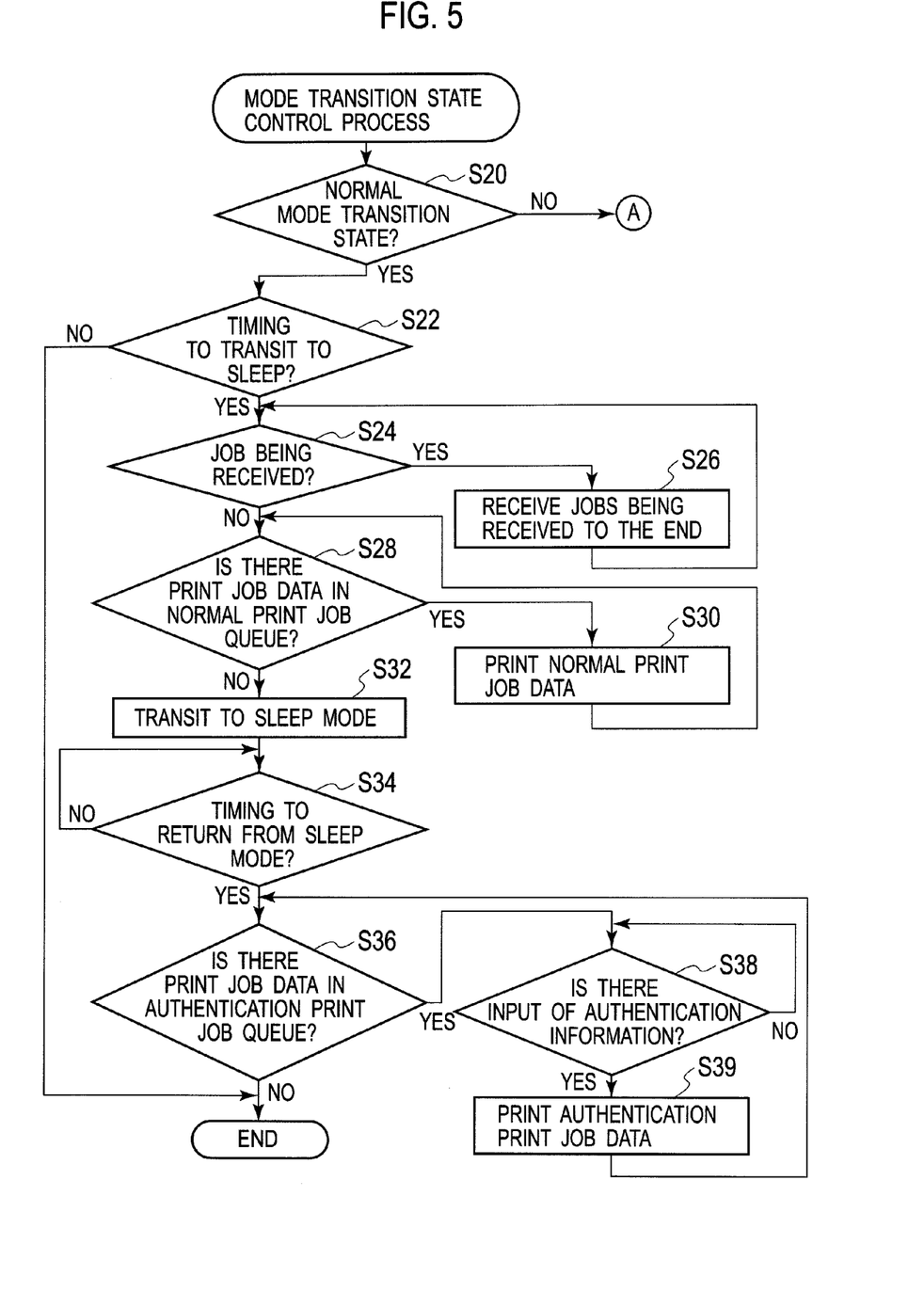
FIG. 5 is a flow chart illustrating the print control method according to the first embodiment.
Figure 6:
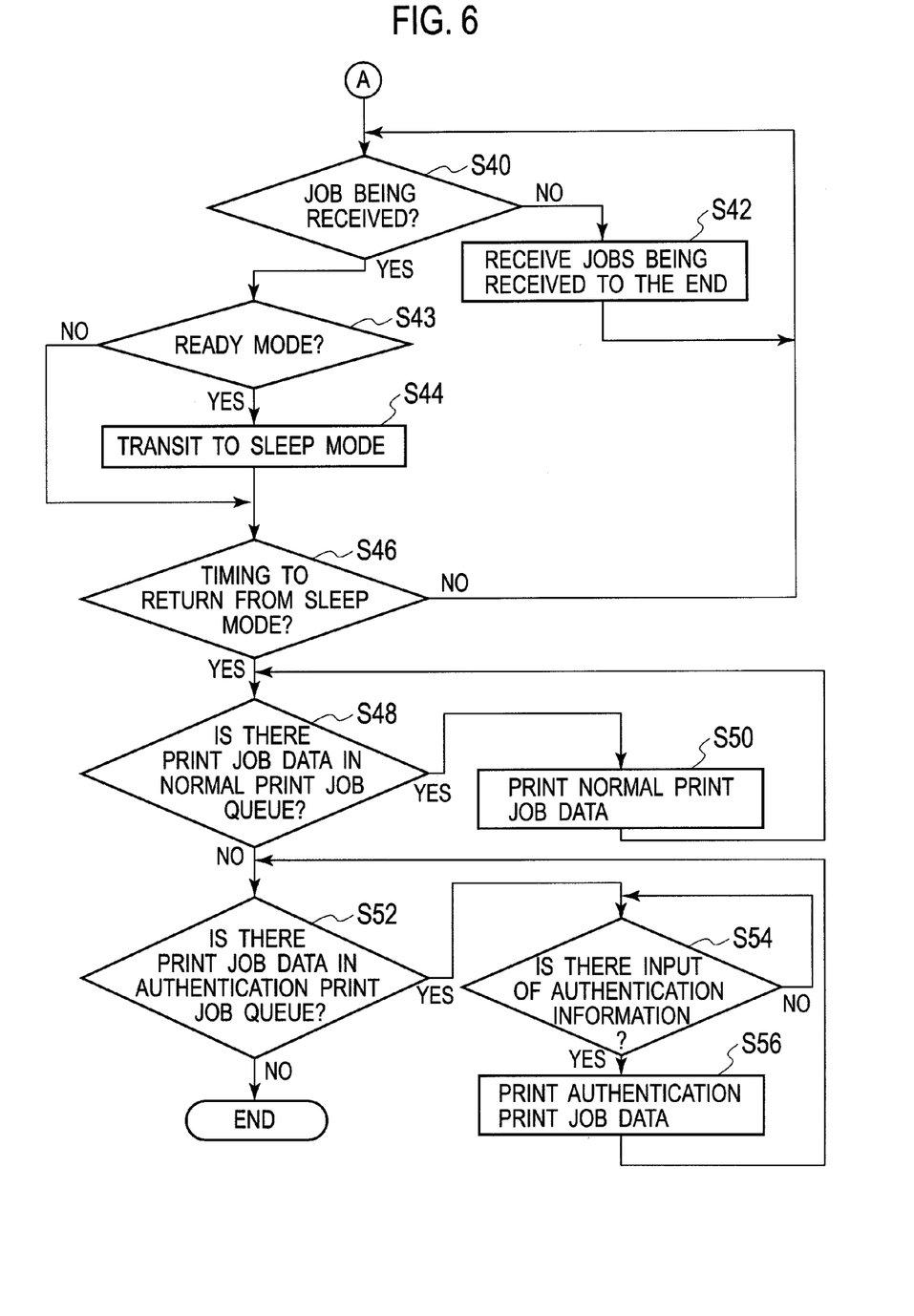
FIG. 6 is a flow chart illustrating the print control method according to the first embodiment.
Figure 7:
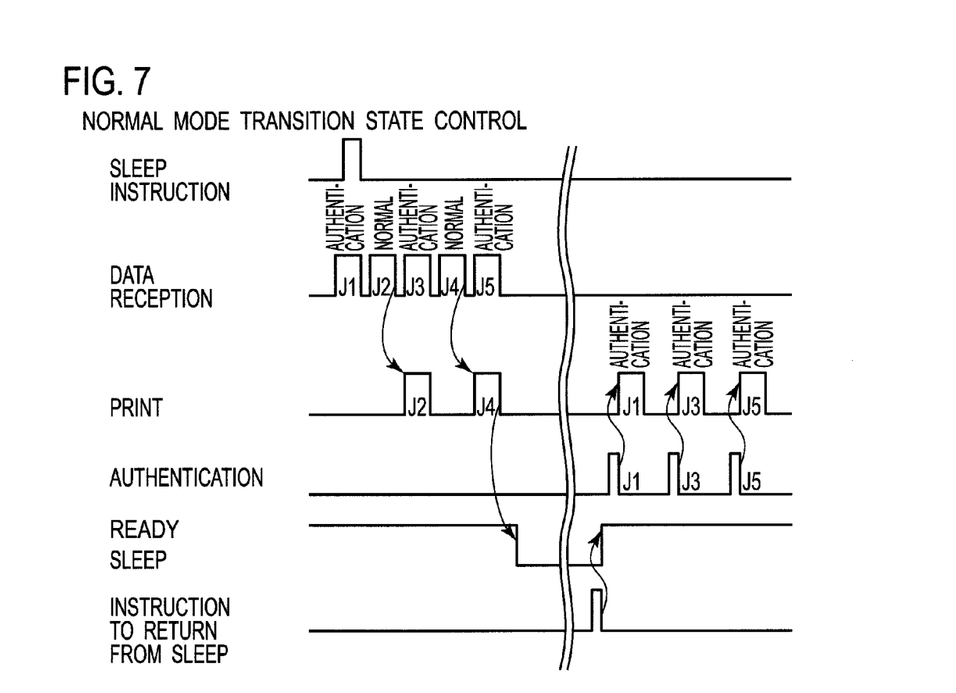
FIG. 7 is a timing chart illustrating the print control method according to the first embodiment.
Figure 8:
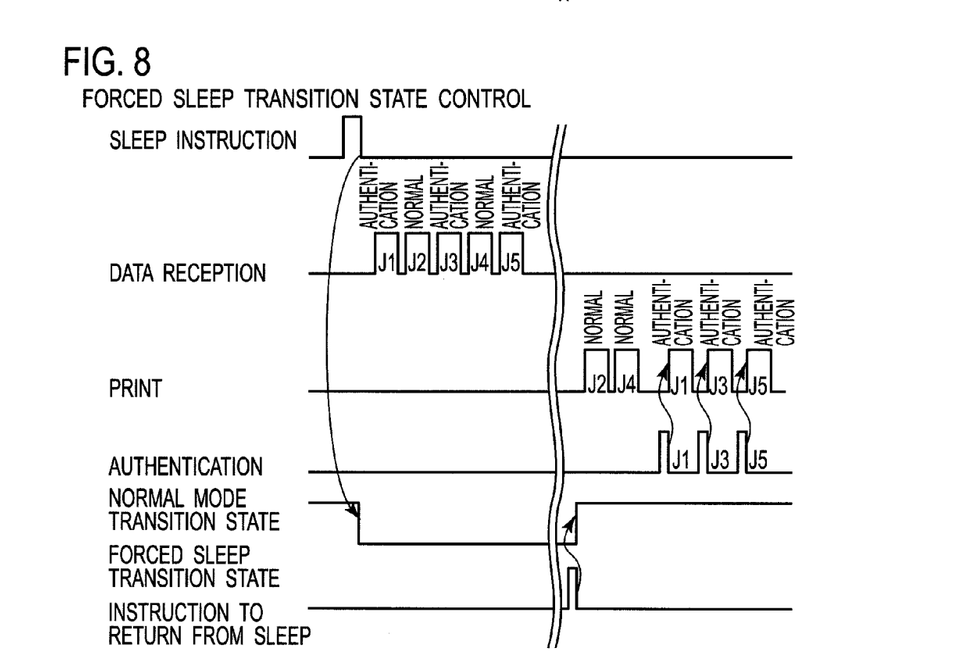
FIG. 8 is a timing chart illustrating the print control method according to the first embodiment.

FIGS. 5 and 6 are flow charts indicating a control process of the mode transition state (control of the normal mode transition state or control of the forced sleep transition state). In addition, FIGS. 7 and 8 are timing charts to complement the explanation of the control process of the mode transition state. A control process of the normal mode transition state is performed up to step S39.

The print control unit 37 determines whether or not the current mode transition state is the normal mode transition state (step S20). If the current state is the normal mode transition state, the process flow proceeds to step S22 and, if the current state is not the normal mode transition state (in other words, the current state is the forced sleep transition state), the process flow proceeds to step S40.

The print control unit 37 determines whether or not it is a timing when transition from the ready mode to the sleep mode of the normal mode transition state is about to occur (step S22). If it is not the timing when transition to the sleep mode of the normal mode transition state is about to occur, the process is terminated and, if it is the timing to transit to the sleep mode of the normal mode transition state, the process flow proceeds to step S24.

The print control unit 37 determines whether or not the communication processing unit 31 is successively receiving a plurality of sets of print job data (step S24). If print job data is not being received, the process flow proceeds to step S28.

If print job data is being received, the print control unit 37 continues the ready mode, and terminates the reception process being performed by the communication processing unit 31 (step S26). Subsequently, the print control unit 37 proceeds to the process of step S24. According to this process, one set of print job data J1 is being received and four sets of print job data. J2, J3, J4 and J5 are expected to be successively received, at the timing when a sleep instruction is issued as shown in FIG. 7 for example, transition from the ready mode to the sleep mode of the normal mode transition state will not occur until five sets of print job data are received.

The print control unit 37 determines whether or not the print job data stored in the normal print job queue 33a is stored in the memory unit 33 (step S28). If the print job data stored in the normal print job queue 33a is not stored in the memory unit 33, the process flow proceeds to step S32. If the print job data stored in the normal print job queue 33a is stored in the memory unit 33, the process flow proceeds to step S30.

The print control unit 37 causes the expansion unit 34 and the printing engine unit 35 to perform an expansion process and a printing process according to the normal print job data (step S30). The print control unit 37 subsequently proceeds to step S28.

Specifically, the print control unit 37 instructs the memory unit 33 to transmit the print job data stored in the normal print job queue 33a to the expansion unit 34. The expansion unit 34 performs the expansion process of the normal print job data transmitted from the memory unit 33. When the expansion process by the expansion unit 34 is completed, the print control unit 37 instructs the printing engine unit 35 to cause the mechanical drive unit 36 to perform printing, according to the expanded normal print job data.

Printing of the normal print job data J2 and J4 is performed by the process of step S30, as shown in FIG. 7. Although it is described here that the print control unit 37 performs the expansion process and the printing process of the next print job data after the expansion process and the printing process of one set of print job data are completed, the printing process of the print job data may be started and also the expansion process of the next print job data may be started when the expansion process of one set of print job data is completed.

The print control unit 37 causes the mode of the printing device 3 to transit from the ready mode to the sleep mode of the normal mode transition state (step S32).

The print control unit 37 determines whether or not it is a timing when transition from the sleep mode of the normal mode transition state to the ready mode is about to occur (step S34). Specifically, the print control unit 37 determines whether or not the communication processing unit 31 has received print job data, or whether or not the panel unit 32 has issued an operation instruction to transit to the ready mode.

When it is the above-mentioned timing, the process flow proceeds to step S36 where the print control unit 37 sets the mode of the printing device 3 to the ready mode. If it is not the above-mentioned timing, the process flow returns to step S34.

The print control unit 37 determines whether or not the print job data stored in the authentication print job queue 33b is stored in the memory unit 33 (step S36). If the authentication print job data stored in the authentication print job queue 33b is not stored in the memory unit 33, the process is terminated. If the authentication print job data stored in the authentication print job queue 33b is stored in the memory unit 33, the process flow proceeds to step S38.

The print control unit 37 determines whether or not there is an input of authentication information (step S38). Specifically, the print control unit 37 displays information indicating a request for a user ID and authentication information such as a password (in the following, the user ID and authentication information such as a password are collectively referred to as authentication information) on the panel unit 32.

The authentication information which has been input to the panel unit 32 is sent to the print control unit 37. As a method of inputting authentication information to the panel unit 32, an IC card having authentication information stored therein is caused to contact the panel unit 32 so that the panel unit 32 acquires the authentication information. Alternatively, the user may directly input the authentication information to the panel unit 32. The authentication information which has been input to the panel unit 32 is sent to the print control unit 37.

The print control unit 37 checks matching of the authentication information included in the authentication print job data corresponding to the input authentication information and the authentication information which has been input from the panel unit 32 and, if they match, causes the expansion unit 34 and the printing engine unit 35 to perform the expansion process and the printing process on the print job data stored in the authentication print job queue 33b (step S39). The print control unit 37 then proceeds to step S36. According to the process of steps S34 to S39, a return from the sleep mode of the normal mode transition state occurs as shown in FIG. 7, and the printing process of respective authentication print job data (J1, J3 and J5) is performed whenever the authentication information is input.

A control process of the forced sleep transition state is performed at step S40 and later steps. The print control unit 37 determines whether or not the communication processing unit 31 is receiving print job data (step S40). Here, the form of reception is not limited in particular and thus reception of print job data may refer to receiving one set of print job data, or successively receiving a plurality of sets of print job data.

If print job data is not being received, the process flow proceeds to step S42. If print job data is being received, the print control unit 37 completes the reception process being performed by the communication processing unit 31 (step S43).

The print control unit 37 determines whether or not the mode of the printing device 3 is the ready mode (step S43). That the mode is the ready mode corresponds to a case where print job data is being received when transiting from the normal mode transition state to the forced sleep transition state. If the mode is the ready mode, the process flow proceeds to step S44, whereas the process flow proceeds to step S46 if the mode is not the ready mode.

The print control unit 37 causes the mode of the printing device 3 to transit from the ready mode to the sleep mode of the forced sleep transition state (step S44).

The print control unit 37 determines whether or not it is a timing when transition from the sleep mode of the forced sleep transition state to the ready mode is about to occur (step S46). Here, the timing when transition from the sleep mode of the forced sleep transition state to the ready mode is about to occur refers to a timing of switching from the forced sleep transition state to the normal mode transition state. If it is the timing when transition to the ready mode is about to occur, the process flow proceeds to step S48, whereas the process flow returns to step S40 if it is not the timing when transition to the ready mode is about to occur.

The print control unit 37 determines whether or not normal print job data is stored in the normal print job queue 33a of the memory unit 33 (step S48). If normal print job data is not stored in the normal print job queue 33a, the process flow proceeds to step S52. If normal print job data is stored in the normal print job queue 33a, the process flow proceeds to step S50.

The print control unit 37 causes the expansion unit 34 and the printing engine unit 35 to perform the expansion process and the printing process, according to normal print job data (step S50). Subsequently, the print control unit 37 proceeds to the process of step S48.

The print control unit 37 determines whether or not print job data is stored in the authentication print job queue 33b of the memory unit 33 (step S52). If authentication print job data is not stored in the authentication print job queue 33b, the process is terminated. If authentication print job data is stored in the authentication print job queue 33b, the process flow proceeds to step S54.

The print control unit 37 determines whether or not there is an input of authentication information (step S54). If there is no input of authentication information, the process flow returns to step S54. If, on the other hand, there is an input of authentication information, the print control unit 37 causes the expansion unit 34 and the printing engine unit 35 to perform the expansion process and the printing process on the authentication print job data stored in the authentication print job queue 33b under a condition that coincidence of the authentication information input from an IC card or the like has been confirmed (step S56).

According to the process of steps S46 to S56, the mode transition state is set to the forced sleep transition state by a sleep instruction and, when predetermined time is reached, the mode transition state is set to the normal mode transition state by an instruction to return from sleep, as shown in FIG. 8.

After a plurality of sets of print job data (J1 to J5) has been received during the forced sleep transition state, the mode transition state is set to the normal mode transition state. Then, a printing process of the normal print job data (J2 and J4) is first performed, and thereafter the printing process of respective sets of authentication print job data (J1, J3 and J5) is performed whenever authentication information is input. The print control unit 37 then proceeds to step S52.

[Working Effect of the Present Embodiment]

According to the present embodiment, the print control unit 37 performs the following control process, if the communication processing unit 31 has successively received a plurality of sets of at least one or both of the authentication print job data and the normal print job data, at the timing when transition from the ready mode to the sleep mode of the normal mode transition state is about to occur.

In other words, if the communication processing unit 31 received authentication print job data at the above-mentioned timing, the print control unit 37 causes the printing device 3 to transit to the sleep mode. If on the other hand, the communication processing unit 31 received normal print job data at the above-mentioned timing, the print control unit 37 causes the printing engine unit 35 to print the normal print job data before transiting to the sleep mode. The transition control and the print control by the print control unit 37 are referred to as the control process by the print control unit 37.

Specifically, the print control unit 37 performs the following process, if print job data is received at the timing when transition from the ready mode to the sleep mode of the normal mode transition state is about to occur, with the printing device 3 being set to the normal mode transition state. Before transiting to the sleep mode, the print control unit 37 causes the memory unit 33 to store authentication job data and causes the printing engine unit 35 to print the normal print job data. Then, after having transited from the sleep mode to the ready mode, the print control unit 37 causes the printing engine unit 35 to print the authentication print job data stored in the memory unit 33.

In other words, if the communication processing unit 31 receives print job data at the above-mentioned timing, normal print job data which can be printed earlier is printed prior to the sleep mode of the normal mode transition state. On the other hand, the printing device 3 temporarily transits authentication print job data having an uncertain input of authentication information to the sleep mode of the normal mode transition state. Subsequently, printing of authentication print job data is performed after returning to the ready mode, based on an input of authentication information.

Since no wait of printing due to authentication print job data occurs thereby, the user's desire of printing the normal print job data as soon as possible can be accomplished. In addition, wasteful power consumption caused by that it takes long time to transit to the sleep mode of the normal mode transition state due to waiting for authentication information input can be avoided. In addition, since the user of authentication print job data can perform printing by simply inputting authentication information whenever he wants to print, the user's convenience of authentication print job data is not sacrificed.

Therefore, if print job data is received at the above-mentioned timing, transition to the sleep mode of the normal mode transition state and processing of print job data can be appropriately performed considering the balance between user convenience and power-saving.

In addition, in the present embodiment, the above-mentioned control process is performed by the print control unit 37 if a plurality of sets of at least one or both of the print job data and the authentication print job data is successively received. Accordingly, if one set of print job data has been received, the printing device 3 transits to the sleep mode of the normal mode transition state with a higher priority on power-saving, assuming that influence on the user using the printing device 3 is small. If, on the other hand, a plurality of sets of print job data has been successively received, the above-mentioned control process is performed by the print control unit 37, assuming that influence on the user using the printing device is large. As a result, balance between the user's convenience and power-saving can be further considered.

In addition, according to the present embodiment, the printing device 3 is set to either the forced sleep transition state or the normal mode transition state, depending on the time zone associated with the number of sets of received print job data. Therefore, since it is assumed that a large number of sets of print job data are received from many users in the normal mode transition state corresponding to a time zone in which many sets of job data are received, power-saving can be realized with a higher priority given to earlier processing of print job data from many users.

Specifically, in the normal mode transition state, normal print job data is printed at a timing when transition to the sleep mode is about to occur, before transiting to the sleep mode. In addition, although authentication print job data is printed after having transited to the sleep mode, sleeping time of the normal mode transition state is generally shorter than sleeping time of the forced sleep transition state. Therefore, it can be said that print job data received in the normal mode transition state is processed earlier than when the print job data is received in the forced sleep transition state.

On the other hand, it is assumed that fewer sets of print job data are received in the forced sleep transition state corresponding to a time zone in which fewer sets of print job data are received and thus it can be said that convenience of many users will not be sacrificed by an attempt to realize sufficient power-saving by processing print job data from a small number of users after transiting to the sleep mode of the forced sleep transition state.

As thus described, the user's convenience and power-saving can be realized as a whole by changing the balance between the user's convenience and power-saving, according to the time zone associated with the number of sets of received print job data.

In addition, the print control unit 37 has the following print control function if print job data is received with the print device 3 being set to the forced sleep transition state. The print control unit 37 causes the memory unit 33 to store the received print job data and, after transition to the normal mode transition state and transition to the ready mode occurs, causes the printing engine unit 35 to print the normal print job data and authentication print job data, among the print job data stored in the memory unit 33.

In other words, since the above-mentioned control process of the print control unit 37 is performed if the printing device 3 has been set to the normal mode transition state, printing of the print job data is supposed to be performed as much as possible giving a higher priority to the user's convenience than power-saving in a time zone in which the number of sets of received print job data is assumed to be large.

If, on the other hand, the communication processing unit 31 receives at least either authentication print job data or normal print job data with the forced sleep transition state being set, the print control unit 37 causes the printing engine unit 35 to print the received print job data after transition to the normal mode transition state (transition to the ready mode) occurred.

In the forced sleep transition state, therefore, convenience of many users will not be sacrificed by an attempt to realize sufficient power-saving by processing print job data from a small number of users after transiting to the sleep mode of the forced sleep transition state.

According to the present embodiment, therefore, if the printing device 3 may transit to the forced sleep transition state or the normal mode transition state considering the time zone associated with the number of sets of print job data, the received print job data can be appropriately processed in either state, considering the balance between the user's convenience and power-saving.

<Exemplary Variation of the Embodiment 1>

(1) The first embodiment is configured to cause the printing engine unit 35 to print authentication print job data according to the input of predetermined authentication information, after transition from the sleep mode of the normal mode transition state to the ready mode occurred. However, it is inconvenient for the user to transit to the sleep mode of the normal mode transition state even if the authentication information is immediately input. Accordingly, printing of authentication print job data may be performed as follows.

That is, when causing the printing engine unit 35 to print the authentication print job data, the print control unit 37 may perform printing before transiting to the sleep mode of the normal mode transition state if there is an input of authentication information in a period until printing of normal print job data is completed. In this case, convenience of the user who has input the authentication information earlier can be realized.

In addition, if authentication information is input within a time period that does not sacrifice power-saving, such as a certain time period before or after printing of normal print job data is completed, the authentication print job data may be printed before transiting to the sleep mode of the normal mode transition state.

(2) Although the normal mode transition state and the forced sleep transition state are supposed to be predetermined in the first embodiment, they may be varied depending on the job data reception status of the printing device 3.

Specifically, the print control unit 37 counts, with a predetermined time interval, the number of sets of print job data received per the predetermined time period. The print control unit 37 then my define the time zone in which the predetermined number of sets of received print job data has been exceeded as the normal mode transition state, and defines the time zone in which with the predetermined number of sets of received print job data has not been exceeded as the forced sleep transition state.

(3) In addition, although the first embodiment is configured such that the control process by the print control unit 37 is performed if a plurality of sets of print job data is being successively received when transition from the ready mode to the sleep mode of the normal mode transition state is about to occur in the normal mode transition state, the present invention is not limited thereto. In other words, the above-mentioned control process may be performed in such a case that one set of print job data is being received when transition from the ready mode to the sleep mode of the normal mode transition state is about to occur. In this case, it may be configured that the above-mentioned control process is performed if the amount of the print job data exceeds a predetermined threshold value, whereas transition to the sleep mode of the normal mode transition state directly and uniformly occurs if the predetermined threshold is not exceeded.

(4) In addition, although the first embodiment is configured to transit to the sleep mode of the forced sleep transition state at the start of the time corresponding to the forced sleep transition state, and return to the ready mode at the end of the above-mentioned time, the present invention is not limited thereto. For example, the mode (sleep mode or ready mode) may be left as it is, even if the mode transition state transitions from the normal mode transition state to the forced sleep transition state, or from the forced sleep transition state to the normal mode transition state. In this occasion, the sleep mode of the normal mode transition state is changed to the sleep mode of the forced sleep transition state.

In addition, if the mode of the printing device 3 is the ready mode with the mode transition state having been transited from the normal mode transition state to the forced sleep transition state, it may be configured to transit to the sleep mode of the forced sleep transition state in such a case that no print job data has been received or there has been no predetermined operation instruction for a certain time period. The sleep mode may then be continued as it is.

In addition, if the mode transition state has transited from the forced sleep transition state to the normal mode transition state, the sleep mode of the forced sleep transition state is changed to the sleep mode of the normal mode transition state. It may then be configured to transit from the sleep mode of the normal mode transition state to the ready mode if print job data is received or there is a predetermined operation instruction.

(5) In addition, although description is provided as to the first embodiment that all the print job data received by the communication processing unit 31 is stored in the memory unit 33 when the mode transition state is the forced sleep transition state, the following configuration is also possible. That is, the print control unit 37 may limit, based on the memory capacity of the memory unit 33, the number of sets of print job data to be stored among the print job data received by the communication processing unit 31.

(6) In addition, although the first embodiment is configured to perform different types of control (control by the print control unit 37) in the normal mode transition state and the forced sleep transition state, a same control may be performed in the forced sleep transition state as with the normal mode transition state.

(7) In addition, although the sleep mode of the normal mode transition state and the sleep mode of the forced sleep transition state are different from each other in the first embodiment, it may configured so that the sleep mode of the forced sleep transition state is the same as the sleep mode of the normal mode transition state. Control of the forced sleep transition state may then be performed at the timing of switching from the normal mode transition state to the forced sleep transition state.

<Second Embodiment>

In the first embodiment, print job data received in the forced sleep transition state is temporarily stored in the memory unit 33. In the case of the above-mentioned normal print job data after switching to the normal mode transition state and transition to the ready mode occurred, expansion and printing thereof are directly performed.

However, there may be a case that the user does not know when his printed matter will be output if the forced sleep transition state lasts for a relatively long time. In such a case, it is likely that the printed matter is output without the user anticipating it. For example, the user who was expecting to take out the printed matter early may have not set authentication print. However, there may also be a case that the user wants to perform authentication printing to prevent someone else from seeing the printed matter for an unexpectedly long time, although the user had first thought authentication printing was not necessary based on an assumption that the printed matter would be exposed to eyes of someone else for only a short time.

In the present embodiment, therefore, when printing normal print job data after transition to the normal mode transition state and transition to the ready mode has occurred, expansion and printing is performed according to the input of authentication information in response to the authentication request, as with the authentication print job data.

In the present embodiment, description of respective configurations and processes which are identical to those of the first embodiment is simplified or omitted.

[Configuration of Printing Device 3]

If a request of authentication information is transmitted from the printing device 3 after normal print job data has been transmitted to the printing device 3 with the mode transition state of the printing device 3 being set to the forced sleep transition state, input of the authentication information to the external terminal 2 is allowed, based on the request of authentication information.

The memory unit 33 has a first correspondence table stored therein which is associated with job IDs, user IDs, whether authentication is necessary or not, and authentication information (a password, for example). In addition, the memory unit 33 has second correspondence table stored therein which is associated with user IDs, E-mail addresses, and card IDs for authentication.

When the communication processing unit 31 receives print job data, the print control unit 37 stores a user ID, an authentication flag (information indicating the unnecessity of authentication in the case of normal print job data, information indicating the necessity of authentication in the case of authentication print job data), and authentication information in the print job data, in association with the job ID.

A job ID is a number provided in the order of reception of the received print job data. In addition, the print control unit 37 erases data of already printed jobs from the first correspondence table, when printing of the print job data is completed.

In addition, if there exists normal print job data (print job data for which authentication is unnecessary) in the first correspondence table in the case of forced sleep transition state, the print control unit 37 acquires an E-mail address corresponding to the user ID of the above-mentioned normal print job data. Based on the E-mail address, the print control unit 37 transmits an authentication information request to the external terminal 2 corresponding to the above-mentioned user ID.

In addition, if the authentication information has been sent from the external terminal 2, the print control unit 37 acquires a user ID corresponding to the external terminal 2, referring to the first correspondence table. The print control unit 37 writes the transmitted authentication information into a field of the authentication information in the first correspondence table corresponding to the acquired user ID.

[Print Control Method of the Printing Device 3]

Figure 9:
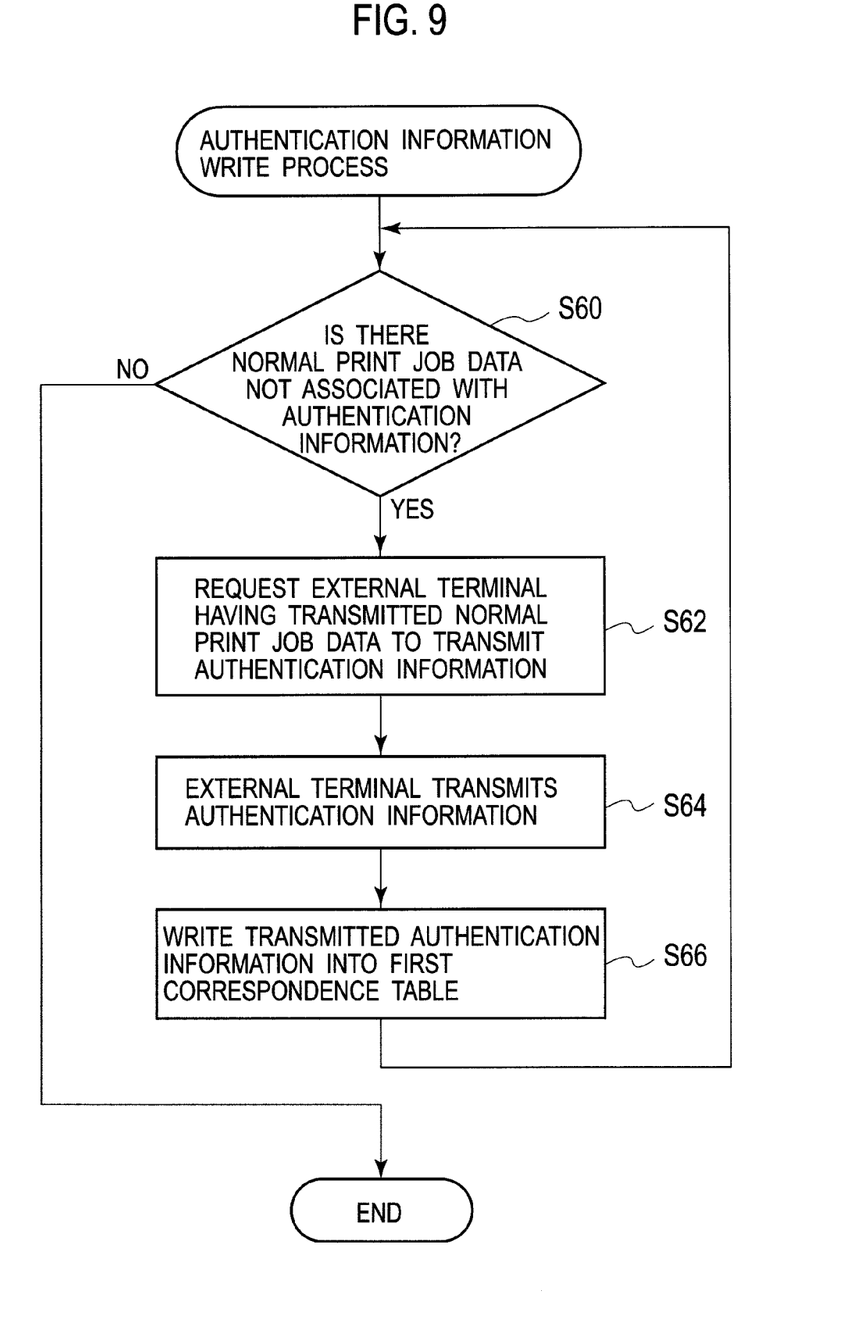
FIG. 9 is a flow chart illustrating a print control method according to a second embodiment.
Figure 10:
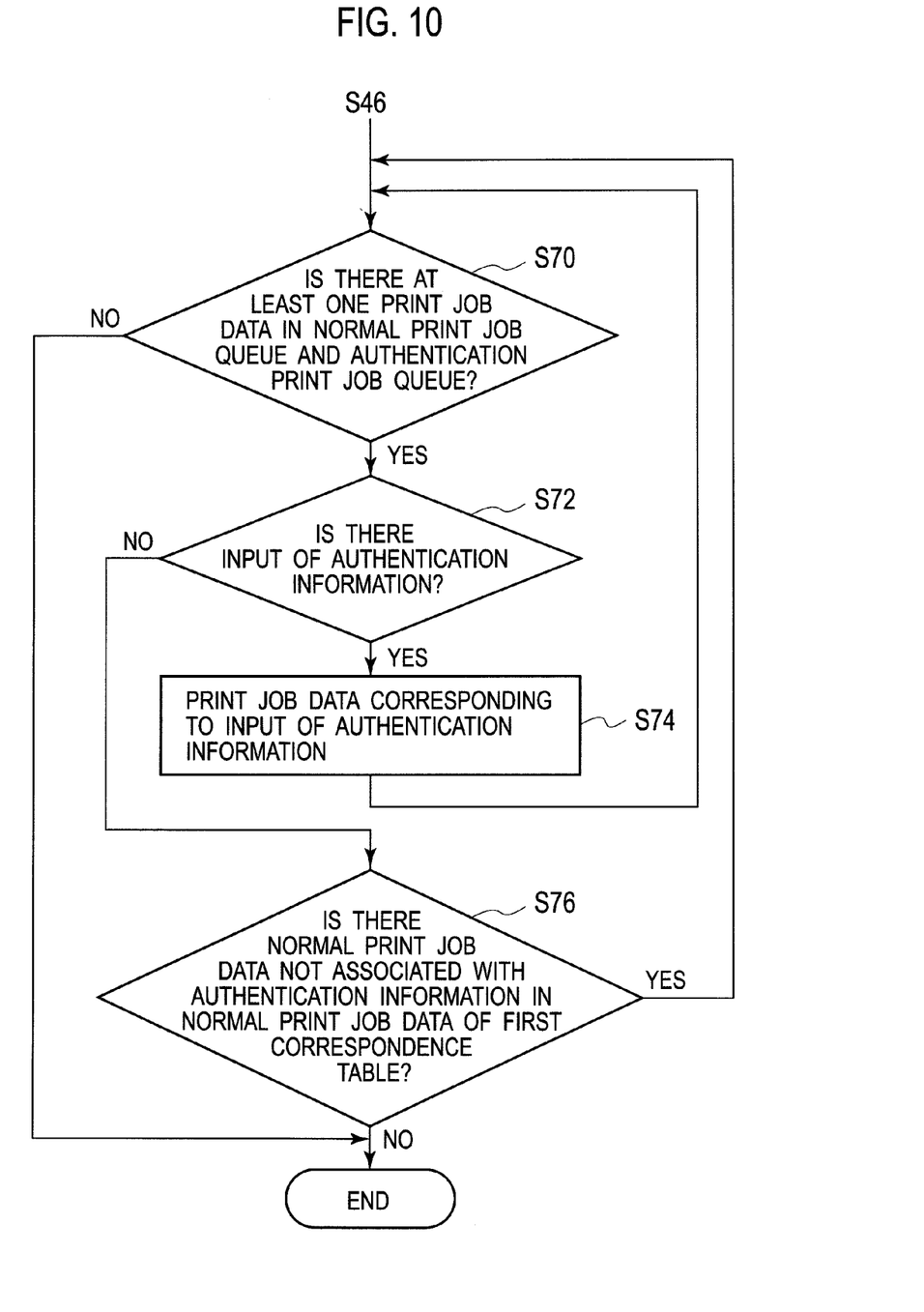
FIG. 10 is a flow chart illustrating the print control method according to the second embodiment.
Figure 11:
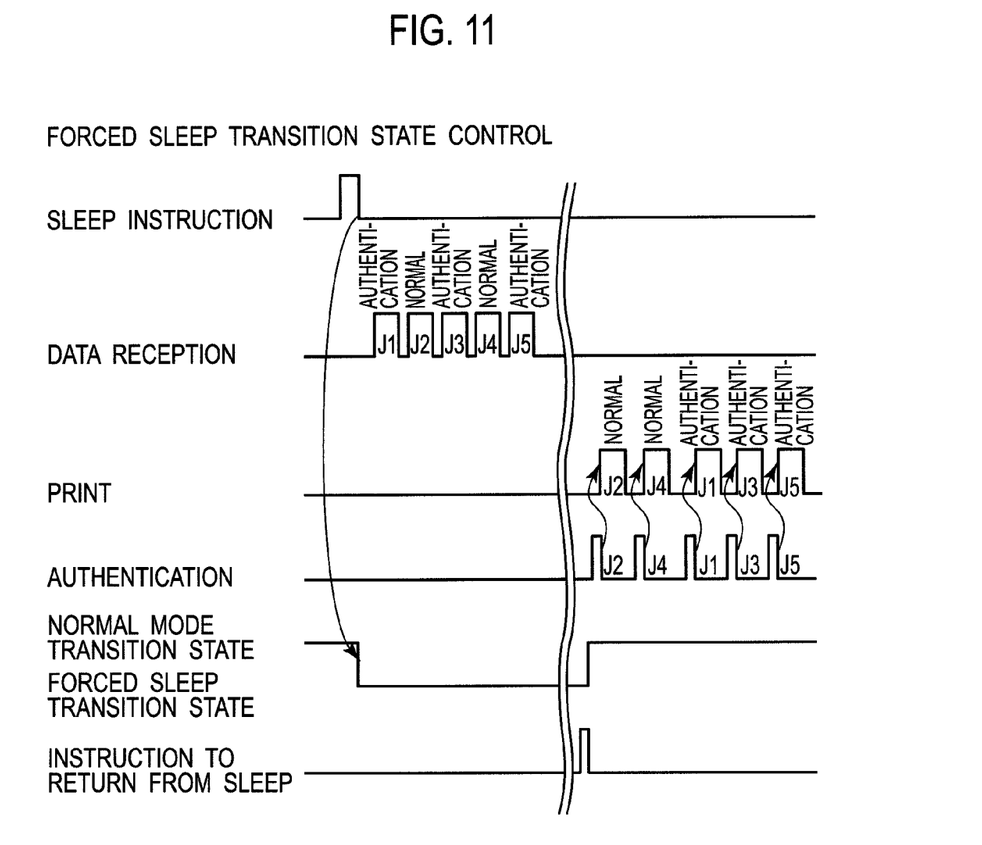
FIG. 11 is a timing chart illustrating the print control method according to the second embodiment.

In a print control method of the present embodiment, the processes up to step S46 FIG. 6 are performed as with the print control method according to the first embodiment. FIG. 9 is a flow chart illustrating an authentication information write process in the print control method of the second embodiment. FIG. 10 is a flow chart illustrating a control process of the forced sleep transition state, and FIG. 11 is a timing chart illustrating its supplementary explanation. The processes of FIGS. 9 and 10 are both performed after step S46.

As shown in FIG. 9, the print control unit 37 determines whether or not normal print job data not associated with the authentication information is stored in the normal print job queue 33a of the memory unit 33 (step S60). As a specific example, the print control unit 37 determines whether or not normal print job data not associated with the authentication information (authentication flag indicating authentication is unnecessary) exists in the memory unit 33, referring to the first correspondence table.

If the normal print job data is stored, the process flow proceeds to step S62, whereas the process is terminated if the normal print job data is not stored.

The print control unit 37 requests the external terminal 2 which transmitted the normal print job data to transmit authentication information (step S62).

The process will be specifically described in the following. The print control unit 37 acquires a user ID of normal print job data with which authentication information is not associated (authentication not required), referring to the first correspondence table. The print control unit 37 acquires an E-mail address corresponding to the acquired user ID, referring to the second correspondence table. The print control unit 37 generates authentication information request data including information indicating that a request for authentication information corresponding to the job ID is issued. The print control unit 37 transmits it to the external terminal 2 corresponding to the acquired E-mail address according to an E-mail supporting protocol such as SMTP, via the communication processing unit 31, a mail server, or the like.

The external terminal 2 generates, in response to the authentication information request data, authentication information response data including information that indicates the authentication information, and transmits it to the print control unit 37 based on the transmission originating E-mail address via the communication processing unit 31 (step S64).

Specifically, upon receiving the authentication information request data by the external terminal 2, information requesting an input of authentication information corresponding to the job ID (for example, "please input a password corresponding to JOB-004", etc.) is displayed. When the user inputs the authentication information to the external terminal 2 based on the above-mentioned display, the external terminal 2 generates authentication information response data including the user ID, the job ID, and the authentication information. The external terminal 2 transmits the authentication information response data to the print control unit 37 via the communication processing unit 31 or the like.

The print control unit 37 writes the transmitted authentication information into a field of the authentication information corresponding to the user ID of the external terminal 2 in the first correspondence table, based on the transmitted authentication information response data (step S66).

The above-mentioned process of FIG. 9 may be performed when the forced sleep transition state is set, or may be performed after transition to the normal mode transition state occurred. The process of FIG. 9 is performed as long as there exists normal print job data not associated with the authentication information in the first correspondence table.

As shown in FIG. 10, the print control unit 37 determines whether or not at least one set of print job data is stored in the normal print job queue 33*a* and the authentication print job queue 33*b* (step S70).

If at least one set of print job data is not stored, the process is terminated. If, on the other hand, at least one set of print job data is stored, the process flow proceeds to step S72.

The print control unit 37 determines whether or not there is an input of authentication information (step S72). If there is an input of authentication information, the process flow proceeds to step S74 provided that authentication information shown below matches, whereas the process flow proceeds to step S76 if there is no input of authentication information.

When the user inputs authentication information in order to print the print job data, the following process is performed specifically. The print control unit 37 causes the panel unit 32 to display a prompt to input authentication information. The user then brings his authentication card in contact with the panel unit 32, an authentication card ID, authentication information, and a user ID included in the authentication card is input to the panel unit 32 and thereafter sent to the print control unit 37. The print control unit 37 acquires a user ID corresponding to the authentication card ID, referring to the second correspondence table, and acquires authentication information corresponding to the user ID, referring to the first correspondence table.

The print control unit 37 compares the information (user ID, authentication information) which has been input to the panel unit 32 and the authentication information (user ID, authentication information) held in the print control unit 37, and determines whether or not they match. When they match, the print control unit 37 controls the expansion unit 34 and the printing engine unit 35 to print the print job data corresponding to input authentication information. If they do not match, the print control unit 37 causes the panel unit 32 to display the fact that they do not match.

If there is an input of authentication information, the print control unit 37 causes the printing engine unit 35 to print the normal print job data or the authentication print job data corresponding to the authentication information (step S74). Subsequently, the process flow proceeds to step S70.

The print control unit 37 determines whether or not there exists, among the sets of normal print job data having been defined that authentication is unnecessary, one which is not associated with the authentication information, referring to the first correspondence table (step S76). Specifically, it is determined that there exists a set of normal print job data which is not associated with the authentication information if it has been determined YES at the process of step S60 in the authentication information write process shown in FIG. 9.

If it is determined that there exists a set of normal print job data which is not associated with the authentication information, the process flow proceeds to step S70, whereas the process is terminated if it is determined that there is no normal print job data which is not associated with the authentication information.

As shown in FIG. 11, through the processes of FIGS. 9 and 10, the mode transition state is set to the normal mode transition state after a plurality of sets of print job data (J1 to J5) has been received in the forced sleep transition state. Accordingly, the printing process of the normal print job data (J2, J4) and the print process of the authentication print job data (J1, J3, J5) are performed whenever an input of authentication information is provided.

[Working Effect of the Present Embodiment]

The present embodiment has the following working effects in addition to those of the first embodiment. Although the user attempts to perform printing, intentionally avoiding authentication printing based on an assumption that the risk of the printed matter being seen by someone else for a long time is low, it is possible that, if normal print job data is received in the forced sleep transition state, the normal print job data is printed after transition to the normal mode transition and transition to the ready mode occurred, without the user's anticipation thereof. As a result, it is a concern for the user that the printed matter may be seen by someone else for a long time against the user's intention.

In the present embodiment, printing of normal print job data is performed after transition to the normal mode transition state and transition to the ready mode occurred, under a condition that there is an input of authentication information. Therefore, it can be avoided that the printed matter is seen by someone else for a long time against the user's intention. As a result, convenience of the user printing the normal print job data can be enhanced.

<Exemplary Variations of the Embodiments>

Although data communication of requesting authentication information and responding thereto when printing normal print job data is performed using an E-mail protocol in the second embodiment, it is not limited thereto and may be performed as follows.

For example, the print control unit 37 may acquire the originating IP address included in the normal print job data, generate authentication information request data using the address as the destination IP address, and transmit it to the external terminal 2. Then, upon receiving the authentication information request data, the external terminal 2 may start an application software corresponding thereto and display the authentication information request. Subsequently, if authentication information is input in response to the authentication information request, the external terminal 2 may transmit information indicating the authentication information to the printing device 3, using the destination IP address as the IP address of the printing device 3.

In addition, the following process may be performed in the first and second embodiments, when successively receiving one or more sets of normal print job data at a timing when transition from the ready mode to the sleep mode (the sleep mode of the normal mode transition state, the sleep mode of the forced sleep transition state) is about to occur in the normal mode transition state or the forced sleep transition state. That is, the print control unit 37 may transit to the sleep mode if the number of sets of received normal print job data is equal to or larger than a predetermined threshold value, or the amount of received normal print job data is equal to or larger than a predetermined threshold value, and perform the printing process of the normal print job data before transiting to the sleep mode if the number of sets of received normal print job data is smaller than a predetermined threshold value, or the amount of received normal print job data is smaller than a predetermined threshold value.

In addition, although the first and second embodiments are directed at the print job data transmitted from the external terminal 2, the present invention is not limited thereto, and is also applicable to a case where the user receives a print job associated with an instruction for a printing operation or receives a print job using a facsimile, after the original text is read by a scanner.

Note that the embodiments and variations described above exemplify a device and a method of implementing the technical idea of the present invention, and the technical idea of the invention does not limit the arrangement or the like of respective components to the followings. The technical idea of the present invention may be modified in various ways within the scope of the appended claims.

As is apparent from the above description, if a print job is received at a timing when the printing device is about to transit from the ready mode to the sleep mode, transition to the sleep mode and processing of print job can be appropriately performed, according to the present invention.

The present application claims the benefit of priority under 35 U.S.C. §119 to Japanese Patent Application No. 2010-237499, filed on Oct. 22, 2010, the entire content of which is incorporated herein by reference.

What is claimed is:

1. A printing device comprising:
    a memory configured to store a received print job;
    a printer configured to perform a printing operation of a print job stored in the memory; and
    a print controller configured to perform switching between a first mode transition state and a second mode transition state, the first mode transition state transiting between a ready mode in which printing is possible and a first sleep mode in which power consumption is smaller than in the ready mode and printing is impossible, the second mode transition state maintaining continuously for a predetermined time period a second sleep mode in which power consumption is smaller than in the ready mode but is larger than in the first sleep mode and printing is impossible;
    wherein in the first mode transition state, the print controller if one or more print jobs are received, at a timing when transition from the ready mode to the first sleep mode is about to occur, causes the memory to store, before transition to the first sleep mode, an authentication job which will not be printed until there is an input of predetermined authentication information among the received print jobs, causes the printer to execute a normal print job other than the authentication print job, and causes the printer to execute the authentication print job stored in the memory according to the input of the predetermined authentication information, after transition from the first sleep mode to the ready mode.

2. The printing device according to claim 1, wherein the print controller is configured to cause the printer to execute the normal print job, based on the input of the predetermined authentication information, after transition to the first mode transition state and transition to the ready mode.

3. The printing device according to claim 1, wherein the second mode transition state, the print controller, if one or more print jobs are received, causes the memory to store the received print job, and causes the printer to execute the print job stored in the memory after transition to the first mode transition state and transition to the ready mode.

4. The printing device according to claim 1, wherein
    the second mode transition state is associated with time zones in which the number of received print jobs is small or expected to be small, and the first mode transition state is associated with time zones in which the number of received print jobs is large or expected to be large.

* * * * *